US012639903B2

(12) United States Patent
Ogura et al.

(10) Patent No.: US 12,639,903 B2
(45) Date of Patent: May 26, 2026

(54) MEASUREMENT APPARATUS, MEASUREMENT SYSTEM, AND MEASUREMENT METHOD

(71) Applicant: NEC Corporation, Tokyo (JP)

(72) Inventors: Kazumine Ogura, Tokyo (JP); Tatsuya Sumiya, Tokyo (JP); Jiro Abe, Tokyo (JP); Nagma Samreen Khan, Tokyo (JP); Yuya Matsumoto, Tokyo (JP)

(73) Assignee: NEC CORPORATION, Tokyo (JP)

( * ) Notice: Subject to any disclaimer, the term of this patent is extended or adjusted under 35 U.S.C. 154(b) by 295 days.

(21) Appl. No.: 18/382,725

(22) Filed: Oct. 23, 2023

(65) Prior Publication Data

US 2024/0144624 A1    May 2, 2024

(30) Foreign Application Priority Data

Nov. 1, 2022    (JP) ................................. 2022-175357

(51) Int. Cl.
 *G06T 19/20*       (2011.01)
 *G01S 17/89*       (2020.01)
 *G06F 3/14*        (2006.01)
(52) U.S. Cl.
 CPC .............. *G06T 19/20* (2013.01); *G01S 17/89* (2013.01); *G06F 3/14* (2013.01); *G06T 2219/2004* (2013.01)
(58) Field of Classification Search
 None
 See application file for complete search history.

(56) References Cited

U.S. PATENT DOCUMENTS 10,614,579 B1 *   4/2020   Kwon ................... G06T 3/4007
2004/0105573 A1   6/2004   Neumann et al.
(Continued)

FOREIGN PATENT DOCUMENTS

JP     2006-503379 A    1/2006
JP     2017-062776 A    3/2017
JP     2022-532695 A    7/2022

OTHER PUBLICATIONS

Jiaxin Li, Gim Hee Lee, "DeepI2P: Image-to-Point Cloud Registration via Deep Classification", arXiv, Apr. 8, 2021, Internet, Searched on Oct. 13, 2022, <URL: https://arxiv.org/pdf/2104.03501.pdf>.

*Primary Examiner* — Daniel F Hajnik
*Assistant Examiner* — Jed-Justin Imperial
(74) *Attorney, Agent, or Firm* — Sughrue Mion, PLLC

(57)         ABSTRACT
An object is to construct an accurate correspondence relation between points included in 3D data and pixels that form an image. An alignment unit receives image data acquired by capturing an image of an object, and 3D data of the object, performs alignment between the image data and the 3D data, and outputs data after the alignment. A pixel selection unit selects a target pixel from a plurality of pixels included in the image data. The pixel point association unit selects, from a plurality of point data items of 3D data included in the data after the alignment, three or more point data items near the target pixel as neighboring point data, estimates one surface based on the neighboring point data, and performs association for calculating a position of the target pixel on the one surface in a space which the plurality of point data items belong to.

19 Claims, 18 Drawing Sheets

(56) References Cited

U.S. PATENT DOCUMENTS

| 2018/0101932 | A1* | 4/2018 | Kwon | ........................ G06T 3/14 |
| 2019/0311546 | A1* | 10/2019 | Tay | ........................ G06T 7/521 |
| 2021/0003710 | A1* | 1/2021 | Tan | ........................ H04N 25/531 |
| 2022/0027642 | A1 | 1/2022 | Shambik et al. | |

\* cited by examiner

MEASUREMENT APPARATUS, MEASUREMENT SYSTEM, AND MEASUREMENT METHOD

INCORPORATION BY REFERENCE

This application is based upon and claims the benefit of priority from Japanese patent application No. 2022-175357, filed on Nov. 1, 2022, the disclosure of which is incorporated herein in its entirety by reference.

TECHNICAL FIELD

The present disclosure relates to a measurement apparatus, a measurement system, and a measurement method.

BACKGROUND ART

For example, in order to observe various kinds of structures and objects such as buildings or bridges, various methods for measuring these structures are known. As these methods, for example, a method for projecting an image onto a three-dimensional model of a structure so that this structure can be visualized (Published Japanese Translation of PCT International Publication for Patent Application, No. 2006-503379), a method for detecting changes over time of a structure from an image (Japanese Unexamined Patent Application Publication No. 2017-062776), and a method for estimating, for an autonomous driving vehicle, the position of a vehicle traveling ahead of the autonomous driving vehicle (Published Japanese Translation of PCT International Publication for Patent Application, No. 2022-532695) have been proposed.

Further, in recent years, a technique for acquiring 3D data indicating a three-dimensional structure of a structure by laser light, which is a so-called Light Detection and Ranging (LiDAR) technique, has become widespread. By combining the 3D data acquired by LiDAR with image data of the structure acquired by capturing this data by a camera or the like, it can be expected that it will be possible to precisely analyze the structure. As a method for combining the above 3D data and image data, a method for performing alignment between points indicating coordinates of respective parts of a structure in 3D data and pixels that form an image has been proposed (Jiaxin Li, Gim Hee Lee, "DeepI2P: Image-to-Point Cloud Registration via Deep Classification", arXiv, Internet, Searched on Oct. 13, 2022, <URL: https://arxiv.org/pdf/2104.03501.pdf>).

SUMMARY

While the alignment between the 3D data and the image can be performed in the method of "DeepI2P: Image-to-Point Cloud Registration via Deep Classification", they cannot be accurately aligned with each other since the coarseness and arrangement of points of 3D data are different from those of pixels of the image. That is, since one-to-one correspondence relation cannot be constructed between points of 3D data and pixels, quantitatively after the alignment cannot be ensured, and therefore rigorous analysis cannot be performed.

Accordingly, it is required to provide a measurement method in which an accurate correspondence relation can be constructed between points of 3D data acquired by LiDAR and pixels of an image.

The present disclosure has been made in view of the aforementioned circumstances, and an object of the present disclosure is to construct an accurate correspondence relation between points included in 3D data and pixels that form an image.

A measurement apparatus according to one aspect of the present disclosure includes: an alignment unit configured to receive image data acquired by capturing an image of an object and 3D data of the object, perform alignment between the image data and the 3D data, and output data after the alignment; a pixel selection unit configured to select a target pixel from a plurality of pixels included in the image data; and a pixel point association unit configured to select, from a plurality of point data items of the 3D data included in the data after the alignment, three or more point data items near the target pixel as neighboring point data, estimate one surface based on the neighboring point data, and perform association for calculating a position of the target pixel on the one surface in a space which the plurality of point data items belong to.

A measurement system according to one aspect of the present disclosure includes: an image-capturing apparatus configured to output image data acquired by capturing an image of an object; a 3D data acquisition apparatus configured to acquire 3D data of the object; and a measurement apparatus configured to associate the image data with the 3D data of the object, in which the measurement apparatus includes: an alignment unit configured to receive the image data and the 3D data, perform alignment between the image data and the 3D data, and output data after the alignment; a pixel selection unit configured to select a target pixel from a plurality of pixels included in the image data; and a pixel point association unit configured to select, from a plurality of point data items of the 3D data included in the data after the alignment, three or more point data items near the target pixel as neighboring point data, estimate one surface based on the neighboring point data, and perform association for calculating a position of the target pixel on the one surface in a space which the plurality of point data items belong to.

A measurement method according to one aspect of the present disclosure includes: receiving image data acquired by capturing an image of an object and 3D data of the object, performing alignment between the image data and the 3D data, and outputting data after the alignment; selecting a target pixel from a plurality of pixels included in the image data; and selecting, from a plurality of point data items of the 3D data included in the data after the alignment, three or more point data items near the target pixel as neighboring point data, estimating one surface based on the neighboring point data, and performing association for calculating a position of the target pixel on the one surface in a space which the plurality of point data items belong to.

According to the present disclosure, it is possible to construct an accurate correspondence relation between points included in 3D data and pixels that form an image.

BRIEF DESCRIPTION OF DRAWINGS

The above and other aspects, features and advantages of the present disclosure will become more apparent from the following description of certain exemplary embodiments when taken in conjunction with the accompanying drawings, in which.

EMBODIMENTS

Hereinafter, with reference to the drawings, example embodiments of the present disclosure will be described. Throughout the drawings, the same components are denoted by the same reference symbols and redundant descriptions will be omitted as necessary.

First Example Embodiment

Figure 1:
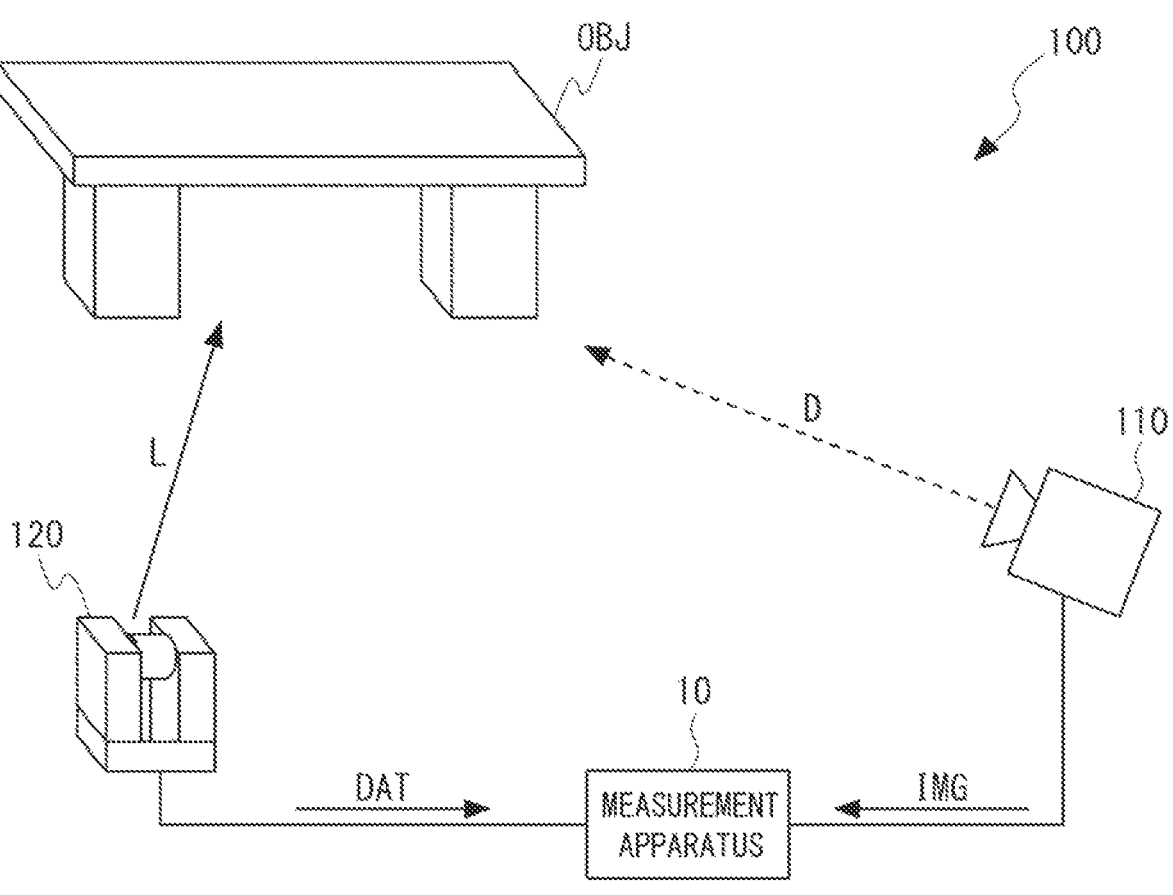
FIG. 1 schematically shows a configuration of a measurement system according to a first example embodiment.

A measurement system 100 according to a first example embodiment will be described. FIG. 1 schematically shows a configuration of the measurement system 100 according to the first example embodiment. The measurement system 100 includes a measurement apparatus 10, a camera 110, and a Light Detection and Ranging (LiDAR) device 120.

Figure 2:
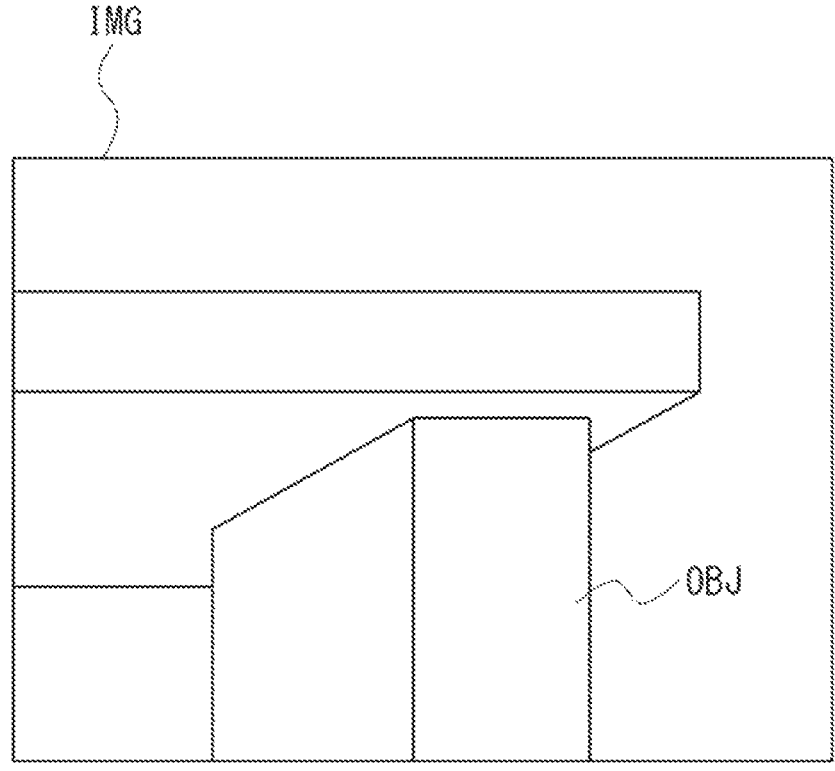
FIG. 2 shows one example of image data acquired by capturing an image of an object to be measured by a camera.

The camera 110 captures an image or video of an object to be measured OBJ from a specific direction and outputs data of the captured image or video to the measurement apparatus 10. In the following, an example in which the camera 110 outputs image data IMG to the measurement apparatus 10 will be described. FIG. 2 shows one example of the image data IMG acquired by capturing an image of the object to be measured OBJ by the camera 110. FIG. 2 shows an example in which an image of a part of an upper right part of the object to be measured OBJ is captured.

Figure 3:
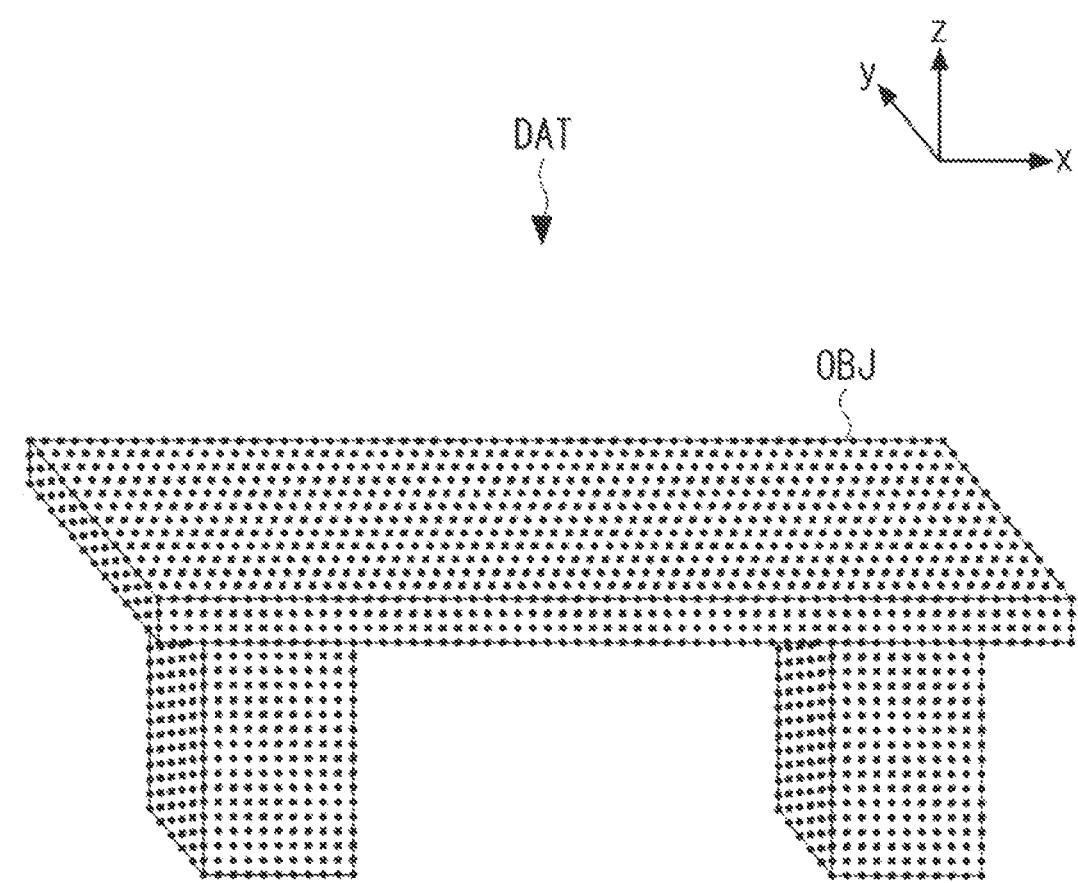
FIG. 3 shows one example of 3D data of the object to be measured acquired by a LiDAR device.

The LiDAR device 120 scans a surface of the object to be measured OBJ in the azimuth direction and the elevation direction by a laser light L, thereby acquiring 3D data including a plurality of point data items indicating as a three-dimensional shape of the object to be measured OBJ and outputting the 3D data to the measurement apparatus 10. FIG. 3 shows one example of 3D data DAT of the object to be measured OBJ acquired by the LiDAR device 120. As shown in FIG. 3, the 3D data DAT is formed as data in which point data items acquired by irradiation of the laser light L by the LiDAR device 120 are aligned in a three-dimensional space. While FIG. 3 shows contour lines of the object to be measured OBJ for the sake of clarification of the drawings, the contour lines are not included in the 3D data DAT.

While the image data IMG is output from the camera 110 to the measurement apparatus 10 and the 3D data DAT is output from the LiDAR device 120 to the measurement apparatus 10 in FIG. 1, this is merely an example. For example, the image data IMG or the 3D data DAT may be stored in another storage device and the measurement apparatus 10 may read the image data IMG and the 3D data DAT from this storage device as necessary.

Figure 4:
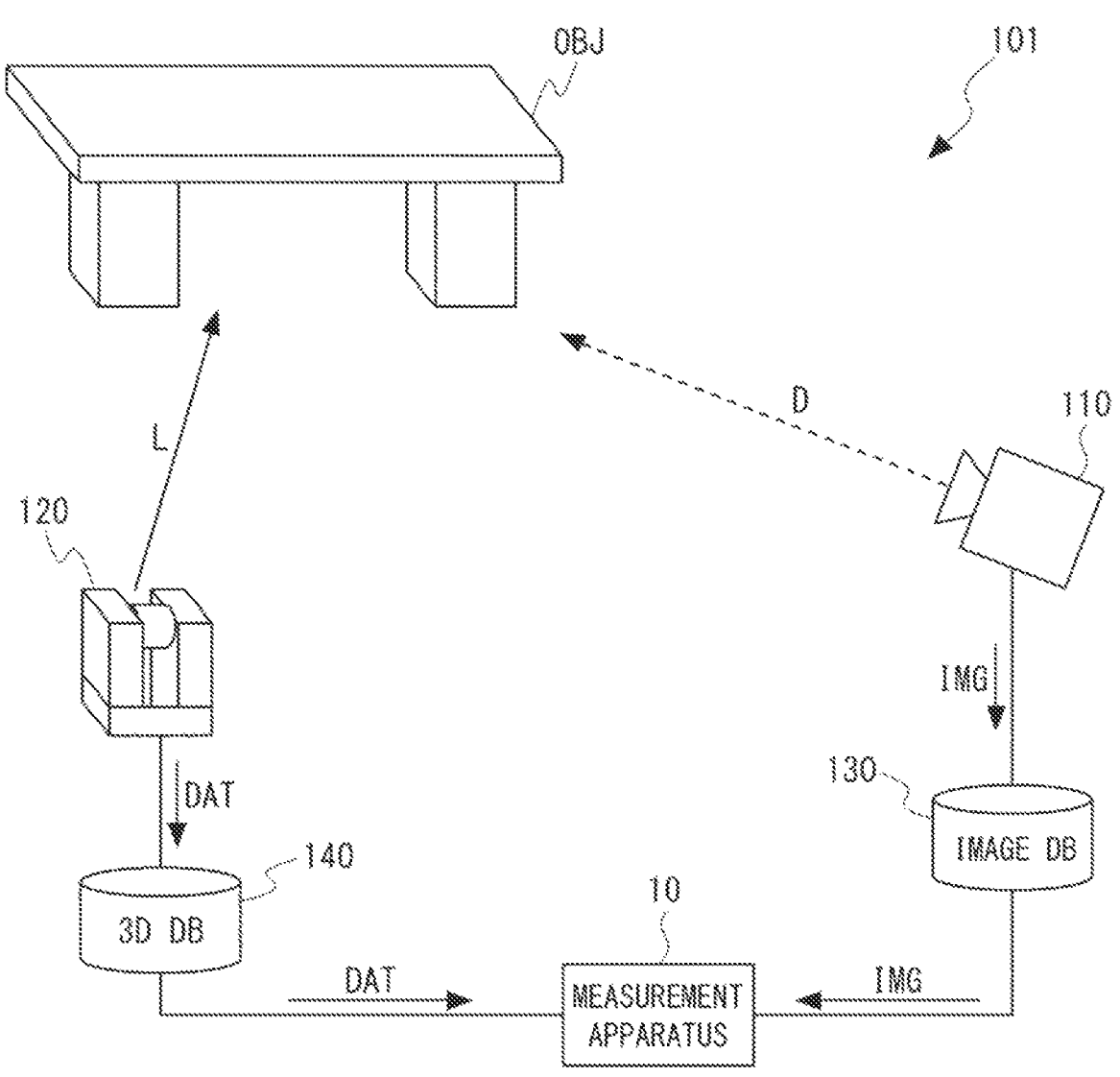
FIG. 4 shows a modified example of the measurement system according to the first example embodiment.

FIG. 4 shows a modified example of the measurement system according to the first example embodiment. A measurement system 101 shown in FIG. 4 further includes, besides the components included in the measurement system 100 shown in FIG. 1, an image database 130 and a 3D database 140. The image database 130 and the 3D database 140 are configured as various kinds of storage devices or are configured in such a way that they can be stored in various kinds of storage devices. The image database 130 stores the image data IMG captured by the camera 110 as appropriate. The 3D database 140 stores the 3D data DAT acquired by the LiDAR device 120 as appropriate. The measurement apparatus reads the image data IMG from the image database 130 and reads the 3D data DAT from the 3D database 140 as necessary.

As a matter of course, the image database 130 may store a plurality of image data items IMG captured by the camera 110 on a plurality of image-capturing occasions. Further, the 3D database 140 may store a plurality of 3D data items DAT acquired by the LiDAR device 120 on a plurality of measurement occasions. In this case, the measurement apparatus 10 may read one image data item IMG and one 3D data item DAT, which form a pair, of one object to be measured OBJ or of one part of the object to be measured OBJ as necessary.

The measurement apparatus 10 is configured as an apparatus that associates pixels of the image data IMG and the point data included in the 3D data based on the image data IMG and 3D data DAT that have been received.

Figure 5:
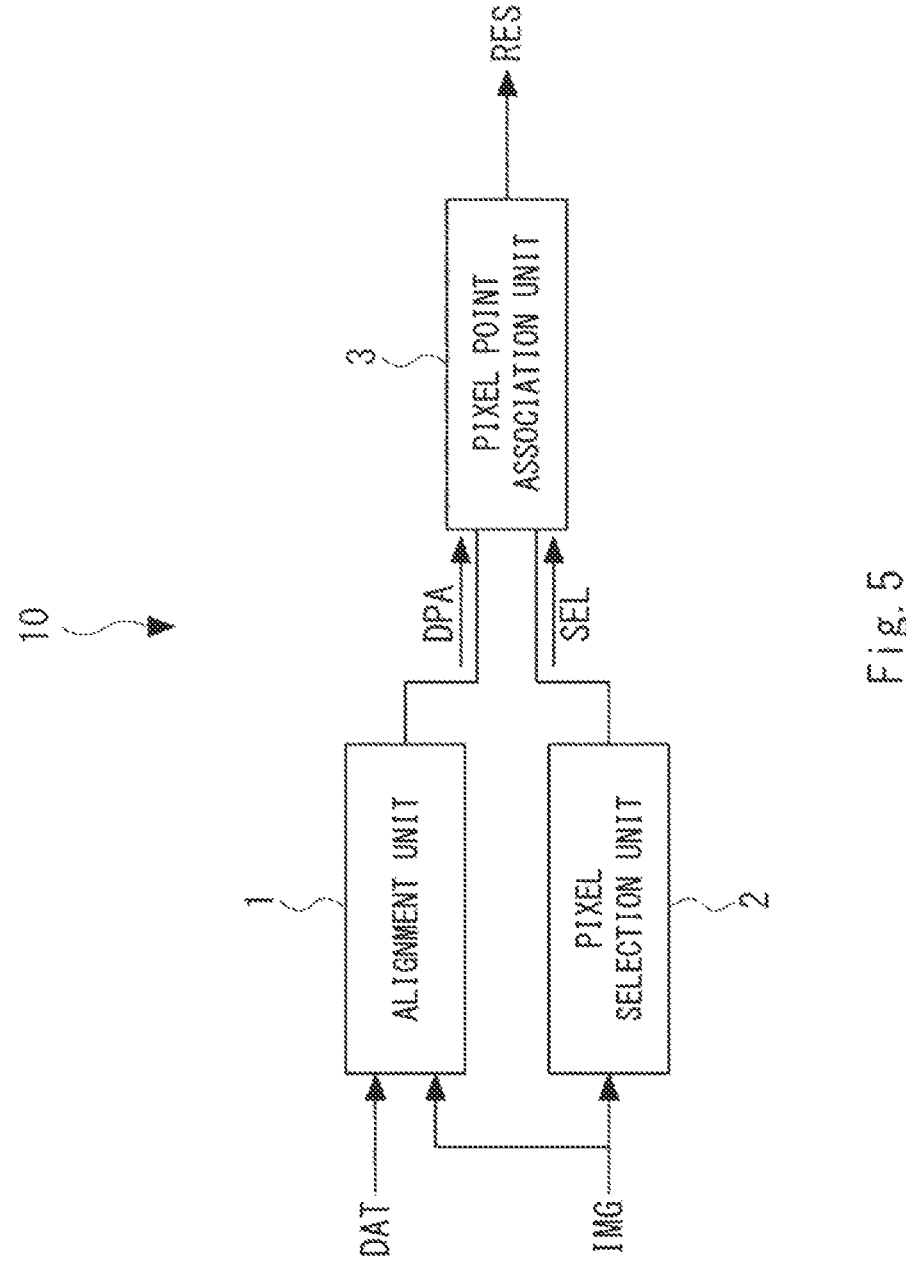
FIG. 5 schematically shows a configuration of a measurement apparatus according to the first example embodiment.

FIG. 5 schematically shows a configuration of the measurement apparatus according to the first example embodiment. The measurement apparatus 10 includes an alignment unit 1, a pixel selection unit 2, and a pixel point association unit 3.

The alignment unit 1 reads the image data IMG and the 3D data DAT, performs alignment of both the image data IMG and the 3D data DAT, and outputs data DPA formed of the image data and the point data after the alignment to the pixel selection unit 2.

The pixel selection unit 2 reads the image data IMG, selects, from pixels in the image data IMG, a target pixel TRG which is to be processed by the pixel point association unit 3, and outputs a selection result SEL indicating the target pixel TRG to the pixel point association unit 3.

The pixel point association unit 3 associates the target pixel TRG in a coordinate space of the point data based on the data DPA received from the alignment unit 1 and the selection result SEL received from the pixel selection unit 2.

The pixel point association unit 3 outputs a calculation result RES of the association between the point data and the pixel.

Figure 6:
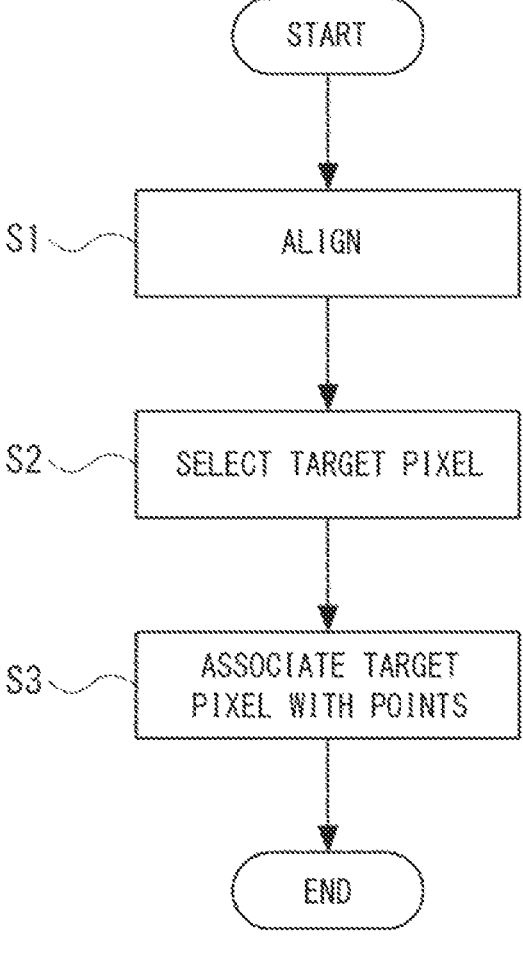
FIG. 6 is a flowchart showing an operation of the measurement apparatus according to the first example embodiment.

Hereinafter, an operation of the measurement apparatus 10 will be described. FIG. 6 shows a flowchart showing an operation of the measurement apparatus 10 according to the first example embodiment.

Step S1

The alignment unit 1 reads the image data IMG and the 3D data DAT. The alignment unit 1 estimates a position (t) and a posture (R) of the camera 110 based on the image data IMG, and aligns the image data IMG and the point data included in the 3D data DAT based on the results of estimating the position and the posture. The method for estimating the position and the posture of the camera 110 is not limited to a specific method and various methods may be applied. Further, the method for aligning the image data IMG after the posture and the position have been estimated and the 3D data DAT is not limited to a specific method as well, and various methods may be applied. Then, the data DPA formed of the image data and the point data after the alignment is output to the pixel selection unit 2.

Step S2

The pixel selection unit 2 reads the image data IMG, selects the target pixel TRG from a plurality of pixels in the image data IMG, and outputs the selection result SEL indicating the target pixel TRG to the pixel point association unit 3.

Step S3

Figure 7:
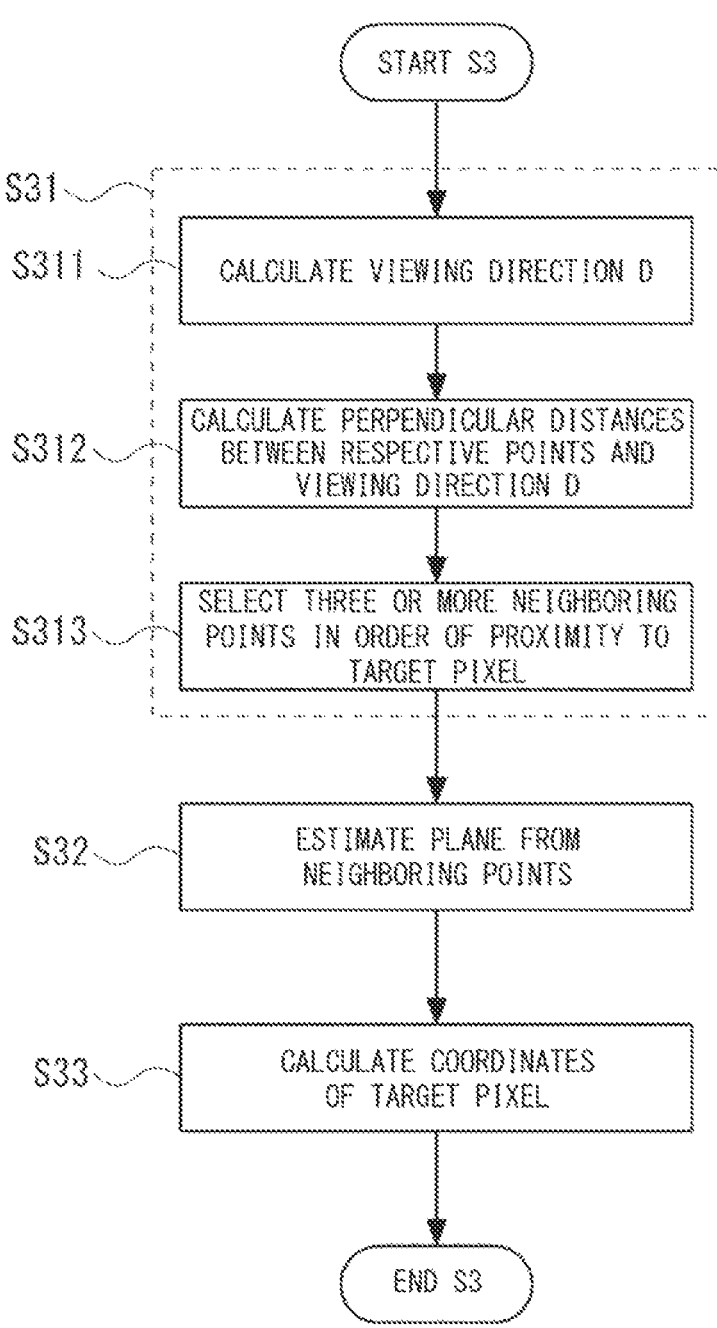
FIG. 7 is a flowchart of processing for associating a target pixel included in an image with a point cloud included in 3D data (Step S3)

The pixel point association unit 3 associates the target pixel TRG included in the image data IMG with the point data included in the 3D data DAT according to the following procedure. FIG. 7 shows a flowchart of processing for associating the target pixel TRG included in the image data IMG with the point data included in the 3D data DAT (Step S3).

Step S31

The pixel point association unit 3 selects, from the data DPA after the alignment, three or more points near the target pixel TRG as neighboring points. The neighboring points may be selected, for example, according to the following procedure.

Step S311

A viewing direction D of the camera 110 that passes through the target pixel TRG is calculated. Since the position and the posture of the camera 110 have been estimated in Step S1, the viewing direction of the camera 110 may be calculated using the results of this estimation. The viewing direction D may be calculated, for example, as a direction that passes through the center point of the target pixel TRG.

Step S312

Figure 8:
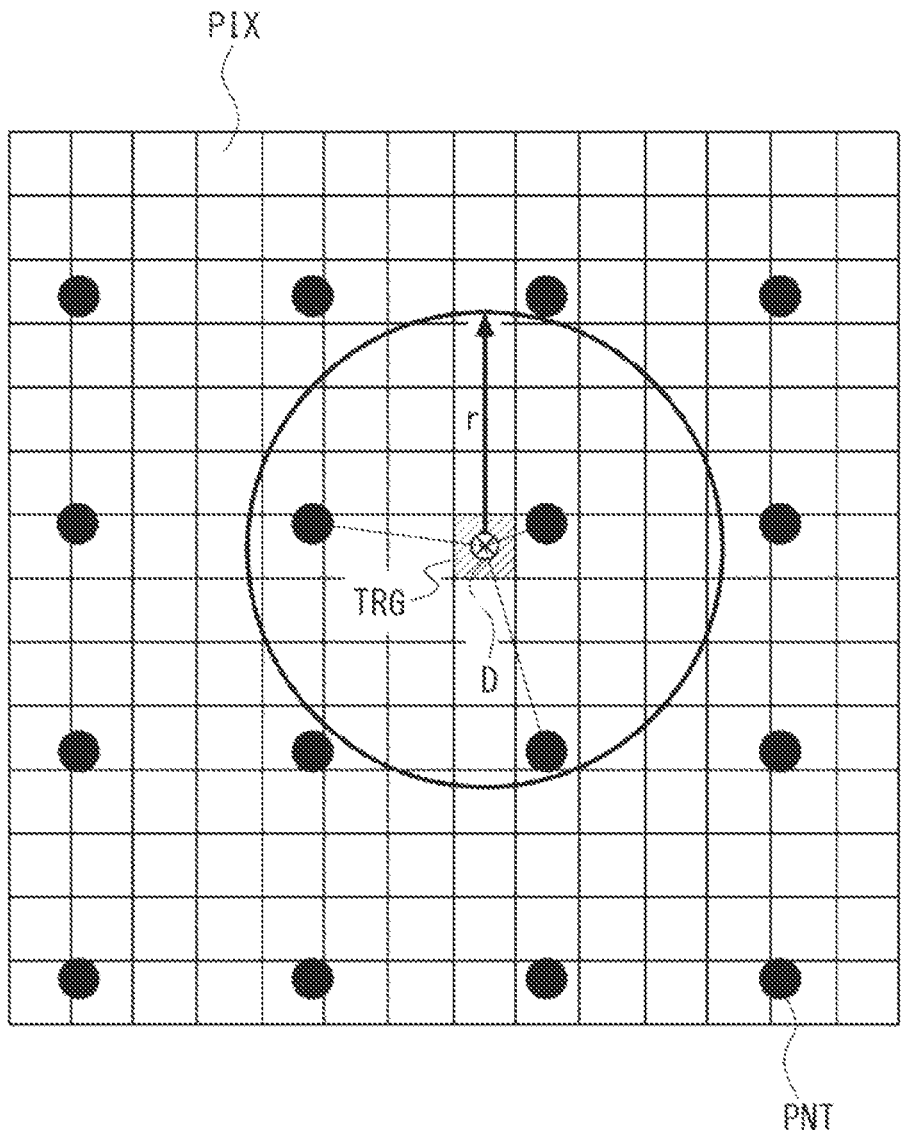
FIG. 8 shows perpendicular distances between respective points and a viewing direction when seen in a viewing direction.

Perpendicular distances between respective points included in the data DPA after the alignment and the viewing direction D are calculated. FIG. 8 shows perpendicular distances between the respective points and the viewing direction D when seen in the viewing direction D. As a matter of course, the paper in FIG. 8 is perpendicular to the viewing direction D. Further, FIG. 8 shows pixels as PIX and the point data as PNT.

Step S313

Three or more points are selected in an order of increasing perpendicular distance. At this time, points in which the calculated perpendicular distances are smaller than a predetermined value may be selected as the neighboring points. For example, a circle that has a radius r and is centered around the viewing direction D may be set, and points in which the calculated perpendicular distances are smaller than the radius r may be selected as the neighboring points.

Step S32

Assuming that the three or more selected points are on one plane, the plane which the target pixel TRG belongs to is estimated. For example, in a three-dimensional Cartesian coordinate system in which the 3D data has been acquired, a plane PL is expressed by a coordinate group that satisfies $ax+by+cz+d=0$. Therefore, the plane PL can be estimated by calculating the coefficients a, b, c, and d based on the three or more selected points. Further, the method for estimating the plane PL is not limited to the above method, and various kinds of methods may be used.

Step S33

The three-dimensional coordinates of the target pixel TRG in the calculated plane PL are calculated. Specifically, for example, the coordinates of the intersection of the calculated plane PL and the viewing direction D are calculated.

While it is assumed that the neighboring points and the target pixel TRG are on the same plane for the sake of clarification of the description in this example, this is merely an example. In place of a plane, a desired curved surface may be estimated by fitting neighboring points. Further, for example, a geometric mesh model formed of a plurality of triangular meshes may be estimated.

As described above, according to this configuration, in a coordinate space which the point data included in the 3D data belongs to, the position of the target pixel, that is, coordinates of the target pixel can be calculated. Accordingly, alignment between image data and 3D data can be precisely performed, whereby they can be accurately associated with each other.

Second Example Embodiment

In the first example embodiment, one target pixel and point data are associated with each other. However, in an object to be measured, there may be not only a position but a phenomenon to be measured such as a line or a two-dimensional area on a surface of the object to be measured. In this case, it is desirable that pixels regarding the phenomenon on the image be associated with 3D data. In this example embodiment, a measurement apparatus that associates pixels regarding the phenomenon on an image with the 3D data will be described.

Figure 9:
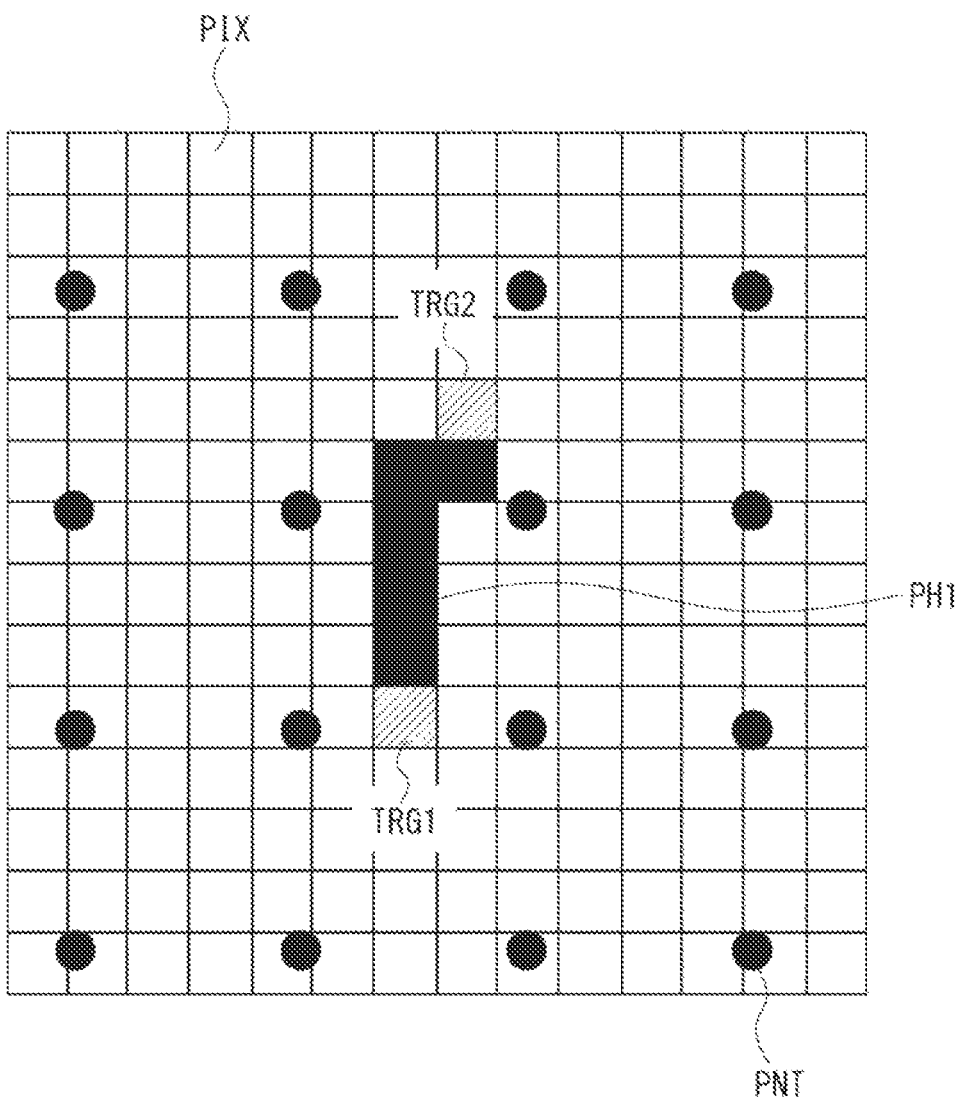
FIG. 9 shows an overview of selection of target pixels according to a second example embodiment.

FIG. 9 shows an overview of selection of target pixels according to the second example embodiment. In this example, for the sake of clarification of the description, it is assumed that there is a linear phenomenon PH1 such as a crack on a surface of an object to be measured OBJ and a target pixel TRG1 that corresponds to one end of the phenomenon PH1 and a target pixel TRG2 that corresponds to the other end of the phenomenon PH1 are selected.

Figure 10:
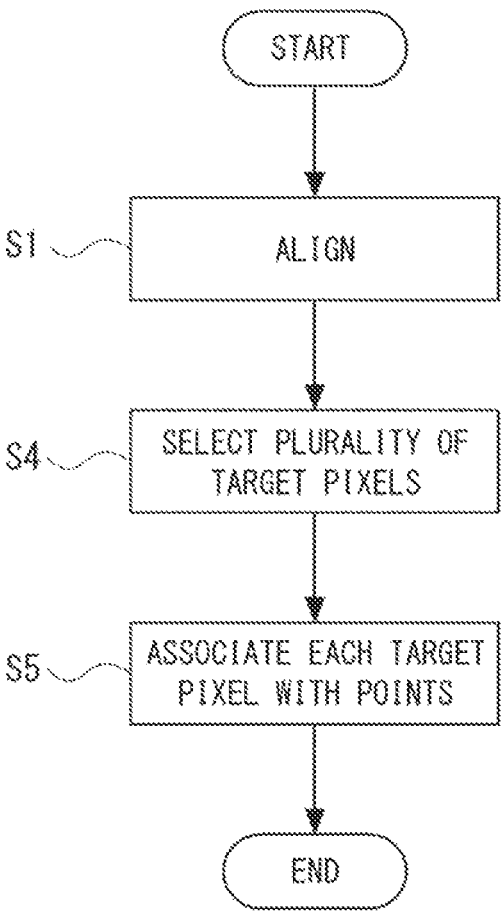
FIG. 10 is a flowchart showing an operation of a measurement apparatus according to the second example embodiment.

FIG. 10 shows a flowchart of an operation of a measurement apparatus according to the second example embodiment.

Step S1

Since Step S1 is similar to that shown in FIG. 6, the redundant description will be omitted.

Step S4 The pixel selection unit 2 reads image data IMG, selects, from pixels in the image data IMG, a plurality of target pixels TRG defining an area including a phenomenon, and outputs a selection result SEL to the pixel point association unit 3.

Step S5

The pixel point association unit 3 performs, for each target pixel, association with the point data included in the 3D data, like in Step S3 in FIG. 6. Since the processing of associating each target pixel with the point data included in the 3D data is similar to that in Step S3, the redundant description will be omitted.

Figure 11:
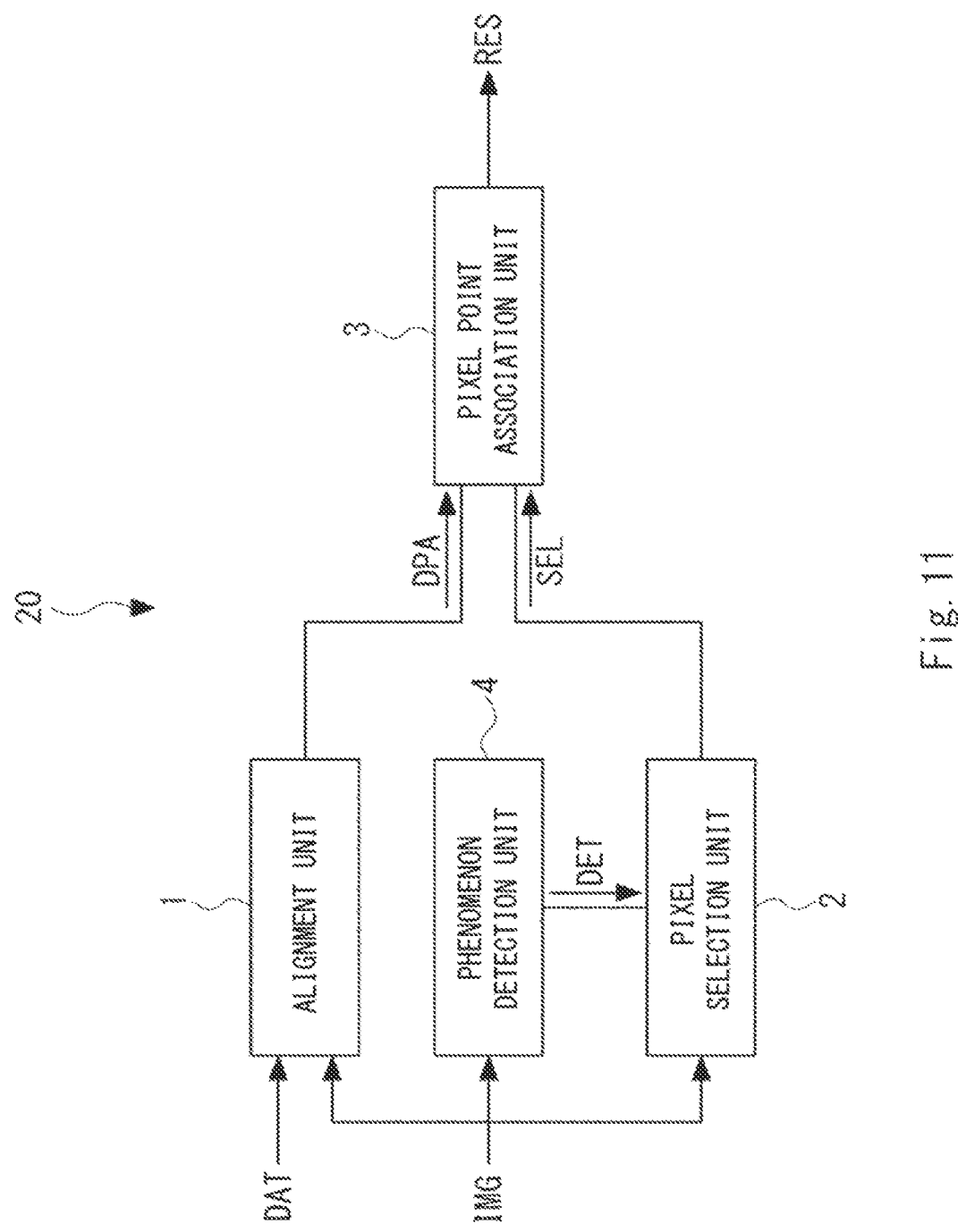
FIG. 11 schematically shows another configuration of the measurement apparatus according to the second example embodiment.

Note that, before target pixels are selected, a characteristic phenomenon such as a crack on the surface of the object to be measured OBJ may be detected, and the target pixels may be selected depending on the detection result. FIG. 11 schematically shows another configuration of the measurement apparatus according to the second example embodiment. A measurement apparatus 20 shown in FIG. 11 includes, besides the components included in the measurement apparatus 10, a phenomenon detection unit 4.

Figure 12:
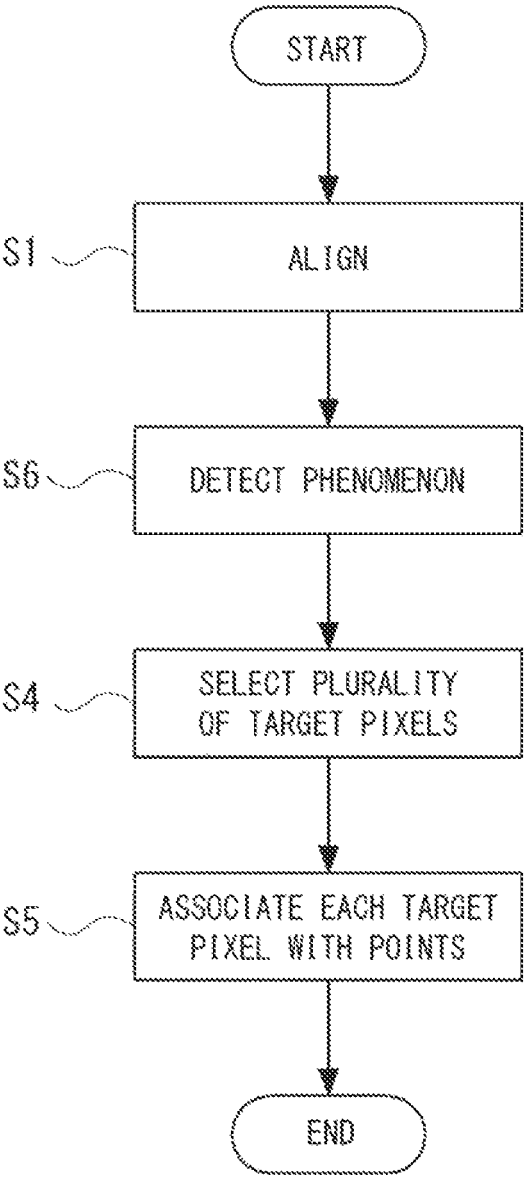
FIG. 12 is a flowchart showing an operation of a case where a phenomenon is detected in the measurement apparatus according to the second example embodiment.

FIG. 12 shows a flowchart of an operation in a case where a phenomenon is detected in the measurement apparatus according to the second example embodiment. FIG. 12 is different from FIG. 10 in that Step S6 which shows processing in the phenomenon detection unit 4 is provided between Step S1 and Step S4 in FIG. 12.

Step S1

Since Step S1 is similar to those shown in FIGS. 6 and 10, the redundant description will be omitted.

Step S6

The phenomenon detection unit 4 reads the image data IMG and detects a phenomenon to be observed such as a line or a two-dimensional area on the surface of the object to be measured OBJ. At this time, the phenomenon to be detected may be any phenomenon such as a part indicating a damage or deterioration on the surface of the object to be measured, like a crack, peeling, discoloration, etc., or a structure such as a protrusion or a concavity that has been built intentionally. When the phenomenon detection unit 4 detects the phenomenon, various detection methods such as a general image recognition technique may be employed.

The phenomenon detection unit 4 outputs a detection result DET indicating the detected phenomenon to the pixel selection unit 2.

Step S4

Step S4 is similar to that shown in FIG. 10. In this example, the pixel selection unit 2 selects a plurality of target pixels depending on the detection result DET.

Step S5

Since Step S5 is similar to that shown in FIG. 10, the redundant description will be omitted.

As described above, according to this configuration, it is possible to automatically detect a phenomenon in an object to be measured OBJ, select target pixels in accordance with the detection result, and perform association processing. In this case, by automatically detecting a phenomenon in the object to be measured OBJ, a time required to perform association processing can be reduced compared to that in a case where detection is manually performed. Further, it can be understood that the effect of reducing the processing time can be obtained especially when there are a plurality of phenomena that should be detected.

While the first example in which two pixels at both ends of a linear phenomenon are selected as target pixels has been described above, this is merely an example. In the following, another example of the method for selecting target pixels will be described.

Figure 13:
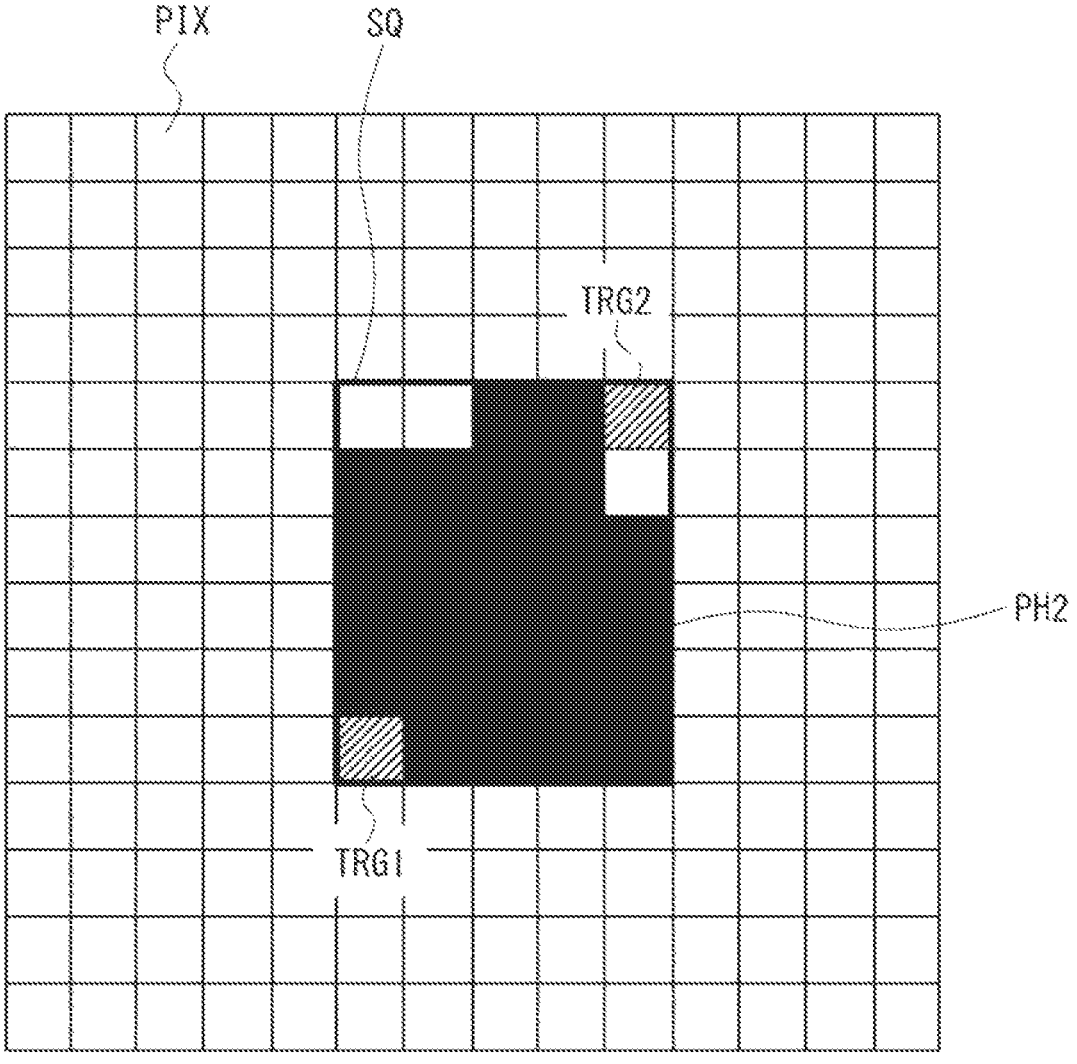
FIG. 13 shows a second example of the selection of target pixels according to the second example embodiment.

FIG. 13 shows a second example of the selection of target pixels according to the second example embodiment. In this example, the phenomenon detection unit 4 selects pixels that define a rectangular area SQ including a detected phenomenon PH2 as target pixels. Specifically, the phenomenon detection unit 4 selects two pixels that are positioned at diagonal points of the rectangular area SQ as target pixels TRG1 and TRG2.

Figure 14:
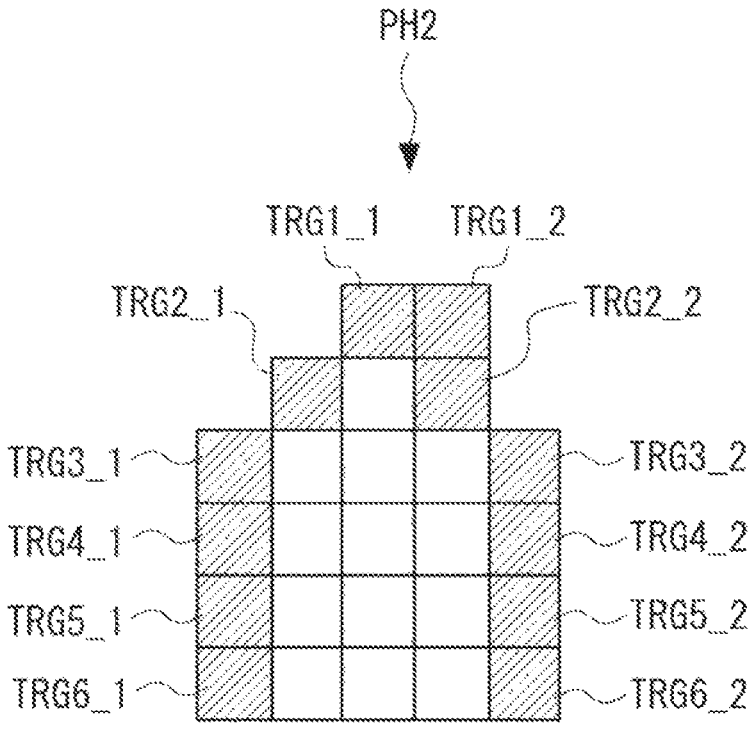
FIG. 14 shows a third example of the selection of target pixels according to the second example embodiment.

FIG. 14 shows a third example of the selection of target pixels according to the second example embodiment. For the sake of simplification, FIG. 14 only shows pixels that overlap a phenomenon PH2. In this example, the phenomenon detection unit 4 detects the phenomenon PH2, the pixel selection unit 2 selects, in each row where the phenomenon PH is present, the pixel at one end of the phenomenon PH as the first target pixel, and selects the pixel at the other end of the phenomenon PH as the second target pixel depending on the detection result DET. In FIG. 13, six rows of pixels overlap the phenomenon PH. When i denotes an integer equal to or larger than one but equal to or smaller than six, the leftmost pixel in the i-th row from the top is selected as a target pixel TRGi_1 and the rightmost pixel is selected as a target pixel TRGi_2.

In this example, the detected phenomenon PH2 can be traced more accurately than in the second example shown in FIG. 13. As a matter of course, the phenomenon detection unit 4 may select pixels at both ends of the phenomenon as target pixels in each column where the detected phenomenon is present.

Third Example Embodiment

In this example embodiment, a method for displaying results of association processing will be described. In the second example embodiment, the first example in which a phenomenon is a linear phenomenon and the second and third examples in which pixels of an area occupied by a phenomenon are focused on have been described. In this case, by displaying target pixels or the like when an image regarding the results of the association is displayed on a display unit, it can be expected that a user will easily recognize the results.

Figure 15:
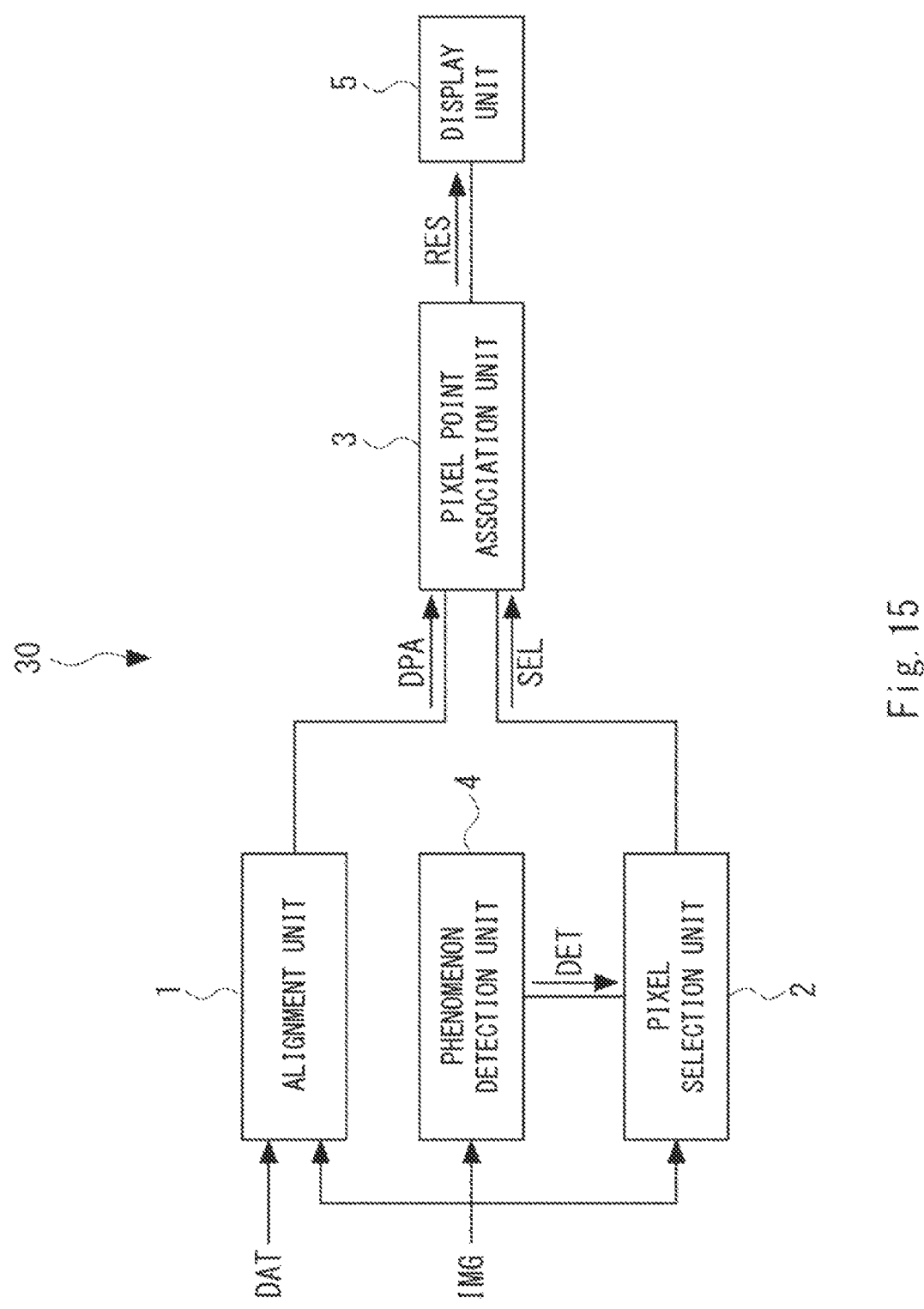
FIG. 15 schematically shows a configuration of a measurement apparatus according to a third example embodiment.

FIG. 15 schematically shows a configuration of a measurement apparatus according to a third example embodiment. The measurement apparatus 30 includes, besides the components of the measurement apparatus 20 shown in FIG. 11, a display unit 5.

The display unit 5 is configured to display results of processing in the pixel point association unit 3 in accordance with a calculation result RES in such a way that the result can be visually recognized. The display unit 5 displays, for example, coordinates of a plurality of target pixels TRG calculated by the pixel point association unit 3. Further, the display unit 5 may display, for example, a rectangular area defined by the plurality of target pixels TRG.

Figure 16:
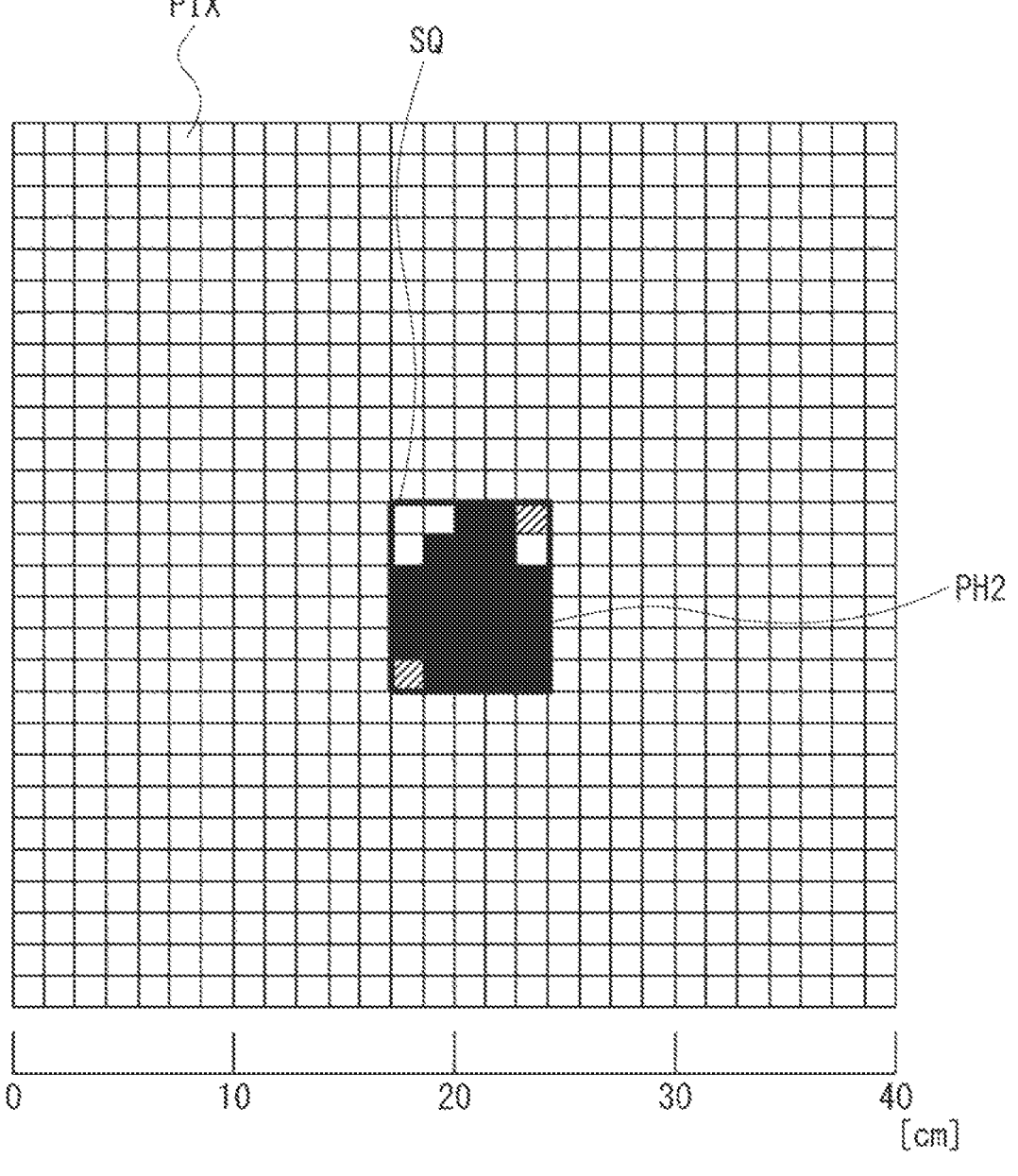
FIG. 16 shows a display example of image data in a case where a rectangular area is set (a second example)

Hereinafter, as an example of the display method, a display method in the second example will be described. FIG. 16 shows a display example of image data in a case where a rectangular area is set (second example). In this display example, a rectangular area that includes a detected phenomenon and target pixels are displayed on image data. Accordingly, a user can understand how the target pixels have been set and measured for a specific phenomenon.

Further, in the first display example, a scale indicating the scale size on the display screen is displayed. According to this configuration, the pixels of the image data IMG and point data of 3D data DAT accurately correspond to each other, whereby dimensions in the 3D data DAT can be projected onto the image data IMG. Accordingly, as shown in FIG. 16, the scale can be displayed. Accordingly, quantitative analysis, which has been impossible in general methods, can be achieved. Further, in addition to displaying the scale, a user may specify two pixels by operating an input device such as a mouse, whereby the dimension between these two pixels may be calculated and displayed.

Further, the user may specify the specific area, whereby the size of the specified area may be calculated and displayed.

Figure 17:
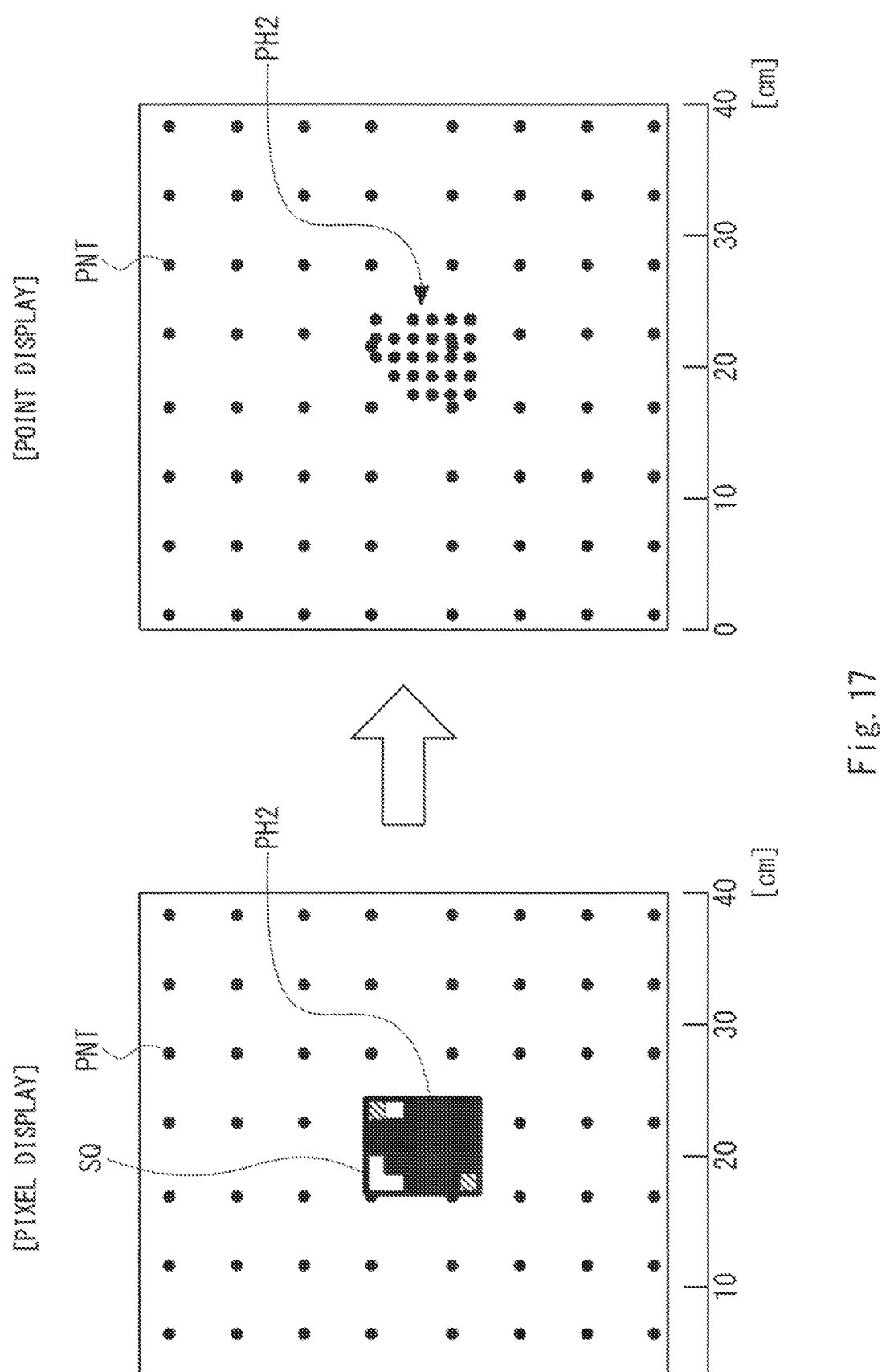
FIG. 17 shows a display example of 3D data in a case where the rectangular area is set (the second example)

Next, FIG. 17 shows a display example of 3D data in a case where a rectangular area is set (second example). As shown in the left part of FIG. 17, in a state in which point data of a specific area of 3D data is displayed, pixels indicating a phenomenon PH2 included in the image data IMG and a rectangular area SQ including the phenomenon PH2 may be displayed, or the pixels indicating one of them may be displayed. In this case as well, the user can understand how the target pixels have been set and measured for a specific phenomenon on the 3D data without switching to the image data IMG.

Further, as shown in the right part of FIG. 17, in a state in which point data of a specific area of 3D data is displayed, point data that corresponds to respective pixels that form a phenomenon PH2 included in image data IMG may be displayed. Accordingly, the phenomenon PH2 can be expressed only by the point data.

Further, in this case as well, like in FIG. 16, the display of the scale, and calculation and display of the dimension between two pixels or the size of the specific area may be performed.

As described above, in the display on the display unit 5, display of the scale, and calculation and display of the dimension between two pixels and the size of the specific area are performed, which enables the user to recognize that quantitative analysis of the displayed part can be performed and perform necessary analysis.

Other Example Embodiments

Note that the present disclosure is not limited to the above-described example embodiments and may be changed as appropriate without departing from the scope of the disclosure. For example, processing executed by the measurement apparatus according to the above-described example embodiments may be achieved by causing a computer to execute a program. Specifically, one or more programs including an instruction group for causing a computer system to perform an algorithm regarding the transmission signal processing or reception signal processing may be created, and this program may be supplied to the computer.

These programs may be stored and provided to a computer using any type of non-transitory computer readable media. Non-transitory computer readable media include any type of tangible storage media. Examples of non-transitory computer readable media include magnetic storage media (such as flexible disks, magnetic tapes, hard disk drives, etc.), optical magnetic storage media (e.g., magneto-optical disks), CD-Read Only Memory (ROM), CD-R, CD-R/W, semiconductor memories (e.g., mask ROM, Programmable ROM (PROM), Erasable PROM (EPROM), flash ROM, Random Access Memory (RAM)). Further, the program may be provided to a computer using any type of transitory computer readable medium. Examples of transitory computer readable media include electric signals, optical signals, and electromagnetic waves. Transitory computer readable media can provide the program to a computer via a wired communication line (e.g., electric wires, and optical fibers) or a wireless communication line.

Figure 18:
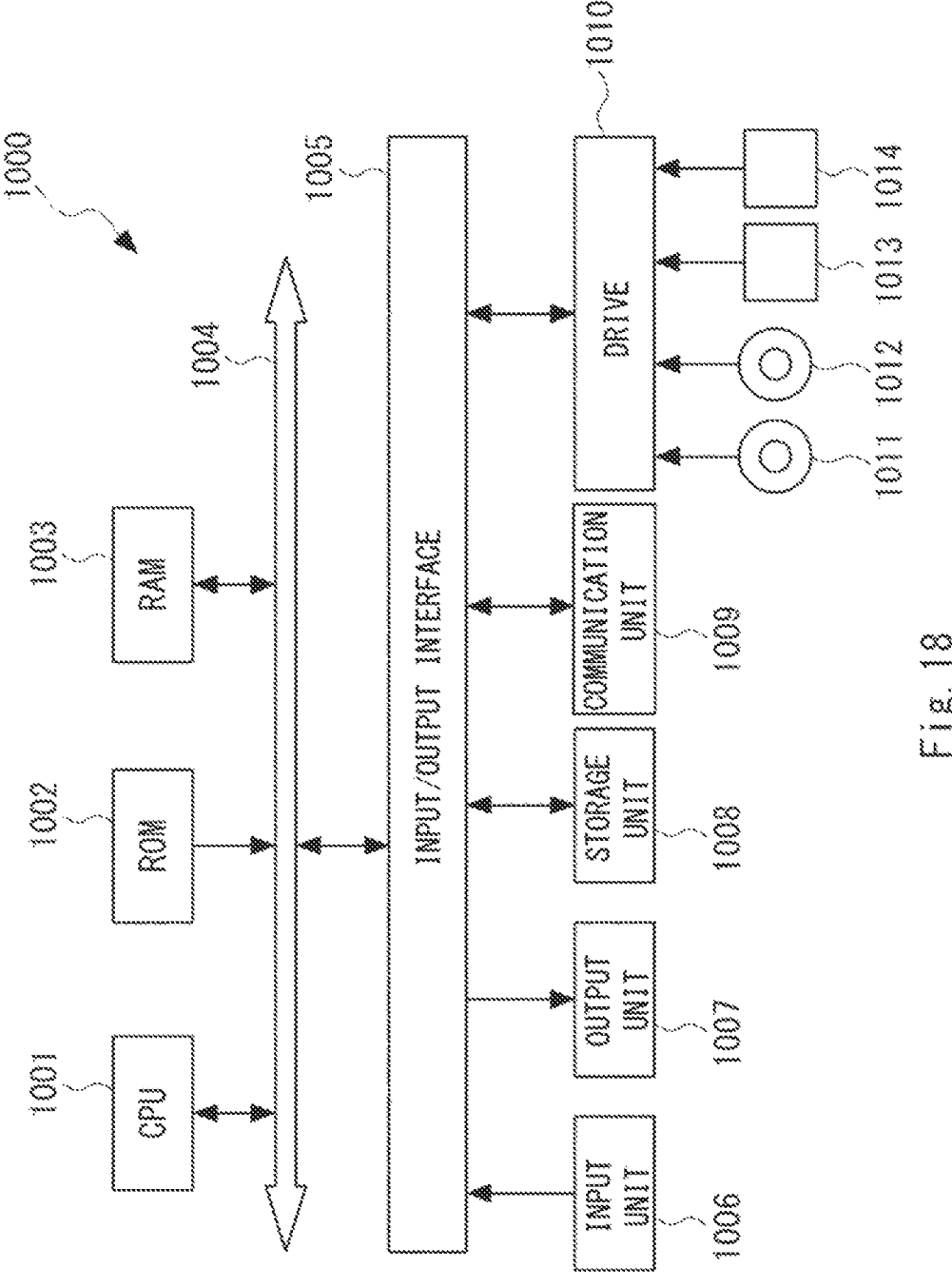
FIG. 18 schematically shows a configuration of a computer, which is one example of a hardware configuration for implementing a measurement apparatus.

FIG. 18 schematically shows a configuration of a computer 1000, which is one example of a hardware configuration for providing a measurement apparatus. The computer 1000 is composed as any type of computer, such as a dedicated computer or a personal computer (PC). However, it is not necessary that the computer be a physically single one and a plurality of computers may instead be provided when distribution processing is executed. As shown in FIG. 18, the computer 1000 includes a Central Processing Unit (CPU) 1001, a Read Only Memory (ROM) 1002, and a Random Access Memory (RAM) 1003, and they are connected to one another via a bus 1004. While the description will be omitted, this computer naturally includes OS software and the like for operating the computer.

An input/output interface 1005 is connected to the bus 1004. An input unit 1006, an output unit 1007, a storage unit 1008, and a communication unit 1009 are connected to the input/output interface 1005.

The input unit 1006 is composed of, for example, a keyboard, a mouse, a sensor and the like. The output unit 1007 is composed of, for example, a display device such as an LCD and/or a voice output device such as headphones and a speaker. The communication unit 1009 is composed of, for example, a router or a terminal adapter. The storage unit 1008 is composed of a storage device such as a hard disk or a flash memory.

The CPU 1001 is able to perform various kinds of processing in accordance with various programs stored in the ROM 1002 or various programs loaded to the RAM 1003 from the storage unit 1008. In this example embodiment, the CPU 1001 executes, for example, processing performed by a measurement apparatus. Besides the CPU 1001, a Graphics Processing Unit (GPU) may be provided. The GPU may execute, like the CPU 1001, various kinds of processing (in this example embodiment, for example, processing performed by the measurement apparatus) in accordance with various programs stored in the ROM 1002 or various programs loaded from the storage unit 1008 to the RAM 1003. Note that the GPU is suitable for applications where routine processing is performed in parallel. By applying the GPU for processing in a neural network that will be described later, for example, the processing speed can be made faster than that in the CPU 1001. Data and the like that are required for the CPU 1001 and the GPU to execute various kinds of processing are stored in the RAM 1003 as well.

The communication unit 1009 can perform bidirectional communication with a server via a network. The communication unit 1009 can transmit data provided from the CPU 1001 to the server and output data received from the server to the CPU 1001, the RAM 1003, the storage unit 1008 and the like. The communication unit 1009 may perform communication with another apparatus using an analog signal or a digital signal. The storage unit 1008, which can exchange data with the CPU 1001, stores and deletes information.

A drive 1010 may be connected to the input/output interface 1005 as necessary. For example, a storage medium such as a magnetic disc 1011, an optical disc 1012, a flexible disc 1013, or a semiconductor memory 1014 may be mounted on the drive 1010 as necessary. The computer program read out from each storage medium may be installed in the storage unit 1008 as necessary. Further, data that is required for the CPU 1001 to execute various kinds of processing, data acquired as a result of processing in the CPU 1001 and the like may be stored in each storage medium as necessary.

It is desirable that the camera 110 and the LiDAR device 120 be installed after the level of the main body of each of them is checked before they capture images or perform measurement. Accordingly, it is possible to ensure the accuracy of detecting the position and the posture of the camera 110 and to perform alignment between the 3D data and the image data with a high accuracy. Further, acceleration sensors may be provided in the camera 110 and the LiDAR device 120 so that the direction of gravity may be detected. In this case, the posture of the camera 110 can be detected with reference to the direction of gravity and the alignment between the 3D data and the image data can be performed with a high accuracy with reference to the direction of gravity.

While the image data and the video data are acquired by a camera in the above-described example embodiments, this is merely an example. The image data and the video data can be acquired by any kind of image-capturing apparatus.

While three or more neighboring points are selected in an order of proximity to the target pixel in the above-described example embodiment, this is merely an example. In general, pixels have information on hue, saturation, and brightness of the pixels. Therefore, for example, point data that overlaps pixels having hues within a certain range with respect to the hue of the target pixel in an order of proximity to the target pixel may be selected as neighboring points. Since it can be assumed that pixels on one plane have approximately the same hue, it is possible to select point data that can be considered to be present on the same plane as the plane of the target pixel more definitely as neighboring points. In this case, saturation or brightness may be used in place of hue, or some or all of the hue, the saturation, and the brightness may be combined with each other.

The whole or part of the above example embodiments can be described as, but not limited to, the following supplementary notes.

(Supplementary Note 1)

A measurement apparatus comprising:

an alignment unit configured to receive image data acquired by capturing an image of an object and 3D data of the object, perform alignment between the image data and the 3D data, and output data after the alignment;

a pixel selection unit configured to select a target pixel from a plurality of pixels included in the image data; and a pixel point association unit configured to select, from a plurality of point data items of the 3D data included in the data after the alignment, three or more point data items near the target pixel as neighboring point data, estimate one surface based on the neighboring point data, and perform association for calculating a position of the target pixel on the one surface in a space which the plurality of point data items belong to.

(Supplementary Note 2)

The measurement apparatus according to Supplementary Note 1, wherein the pixel point association unit calculates perpendicular distances between a viewing direction, which is a direction in which an image-capturing apparatus that has acquired the image data faces, the viewing direction passing through the target pixel, and the plurality of respective point data items, and the pixel point association unit selects the neighboring point data in an order of increasing perpendicular distance.

(Supplementary Note 3)

The measurement apparatus according to Supplementary Note 2, wherein the viewing direction passes through a center point of the target pixel.

(Supplementary Note 4)

The measurement apparatus according to Supplementary Note 2 or 3, wherein point data that is, when seen in the viewing direction, positioned inside a circle that has a predetermined radius and is centered around the viewing direction is selected as the neighboring point data.

(Supplementary Note 5)

The measurement apparatus according to any one of Supplementary Notes 1 to 4, wherein the pixel selection unit selects a plurality of the target pixels, and the pixel point association unit performs the association regarding each of the plurality of target pixels that have been selected.

(Supplementary Note 6)

The measurement apparatus according to Supplementary Note 5, wherein the plurality of target pixels include a first target pixel and a second target pixel, and the pixel selection unit selects a pixel that is positioned at one end of a phenomenon to be measured in the object in the image data as a first target pixel and selects a pixel that is positioned at another end of the phenomenon as a second target pixel.

(Supplementary Note 7)

The measurement apparatus according to Supplementary Note 5, wherein the plurality of target pixels include a first target pixel and a second target pixel, and the pixel selection unit selects a pixel that is positioned at one corner of a rectangular area formed of a plurality of pixels, the rectangular area including a phenomenon to be measured in the object in the image data, as a first target pixel, and selects a pixel that is positioned at a position diagonal to the first target pixel as a second target pixel.

(Supplementary Note 8)

The measurement apparatus according to Supplementary Note 7, further comprising a display unit configured to display the rectangular area on the image data or the 3D data.

(Supplementary Note 9)

The measurement apparatus according to Supplementary Note 5, wherein the plurality of target pixels include a first target pixel and a second target pixel, and the pixel selection unit selects, of pixels that overlap a phenomenon to be measured in the object in the image data, a pixel at one end of each row as the first target pixel and selects a pixel at the other end of each row as the second target pixel, or selects a pixel at one end of each column as the first target pixel and selects a pixel at the other end of each column as the second target pixel.

(Supplementary Note 10)

The measurement apparatus according to Supplementary Note 9, further comprising a display unit configured to display a pixel that overlaps the phenomenon on the image data or the 3D data.

(Supplementary Note 11)

The measurement apparatus according to Supplementary Note 9, further comprising a display unit configured to display point data that corresponds to the pixel that overlaps the phenomenon on the image data or the 3D data.

(Supplementary Note 12)

The measurement apparatus according to any one of Supplementary Notes 8, 10, and 11, wherein the display unit displays the first and second target pixels on the image data or the 3D data.

(Supplementary Note 13)

The measurement apparatus according to any one of Supplementary Notes 8, 10, and 12, wherein the display unit displays, on the image data or the 3D data, a scale in accordance with a scale size of the image data or the 3D data that has been displayed.

(Supplementary Note 14)

The measurement apparatus according to any one of Supplementary Notes 8 and 10 to 13, wherein the display unit displays the calculation result on the image data or the 3D data.

(Supplementary Note 15)

The measurement apparatus according to any one of Supplementary Notes 6 to 13, further comprising a phenomenon detection unit configured to detect a phenomenon to be measured in the object in the image data, and the pixel selection unit selects the first and second target pixels based on the phenomenon detected by the phenomenon detection unit.

(Supplementary Note 16)

The measurement apparatus according to any one of Supplementary Notes 1 to 15, wherein the one surface is a plane or a curved surface calculated based on the neighboring point data.

(Supplementary Note 17)

The measurement apparatus according to any one of Supplementary Notes 1 to 16, wherein the 3D data is formed as a LiDAR device that acquires the 3D data by scanning the object to be measured by laser light.

(Supplementary Note 18)

A measurement system comprising:

an image-capturing apparatus configured to output image data acquired by capturing an image of an object;

a 3D data acquisition apparatus configured to acquire 3D data of the object; and a measurement apparatus configured to associate the image data with the 3D data of the object, wherein the measurement apparatus comprises:

an alignment unit configured to receive the image data and the 3D data, perform alignment between the image data and the 3D data, and output data after the alignment;

a pixel selection unit configured to select a target pixel from a plurality of pixels included in the image data; and a pixel point association unit configured to select, from a plurality of point data items of the 3D data included in the data after the alignment, three or more point data items near the target pixel as neighboring point data, estimate one surface based on the neighboring point data, and perform association for calculating a position of the target pixel on the one surface in a space which the plurality of point data items belong to.

(Supplementary Note 19)

A measurement method comprising:

receiving image data acquired by capturing an image of an object and 3D data of the object, performing alignment between the image data and the 3D data, and outputting data after the alignment;

selecting a target pixel from a plurality of pixels included in the image data; and selecting, from a plurality of point data items of the 3D data included in the data after the alignment, three or more point data items near the target pixel as neighboring point data, estimating one surface based on the neighboring point data, and performing association for calculating a position of the target pixel on the one surface in a space which the plurality of point data items belong to.

(Supplementary Note 20)

A measurement program causing a computer to execute processing of:

receiving image data acquired by capturing an image of an object and 3D data of the object, performing alignment between the image data and the 3D data, and outputting data after the alignment;

selecting a target pixel from a plurality of pixels included in the image data; and selecting, from a plurality of point data items of the 3D data included in the data after the alignment, three or more point data items near the target pixel as neighboring point data, estimating one surface based on the neighboring point data, and performing association for calculating a position of the target pixel on the one surface in a space which the plurality of point data items belong to.

While the disclosure has been particularly shown and described with reference to embodiments thereof, the disclosure is not limited to these embodiments. It will be understood by those of ordinary skill in the art that various changes in form and details may be made therein without departing from the spirit and scope of the present disclosure as defined by the claims.

What is claimed is:

1. A measurement apparatus comprising:

at least one memory configured to store instructions; and at least one processor configured to execute the instructions to:

receive image data acquired by capturing an image of an object and 3D data of the object, perform alignment between the image data and the 3D data, and output data after the alignment;

select a target pixel from a plurality of pixels included in the image data; and select, from a plurality of point data items of the 3D data included in the data after the alignment, three or more point data items near the target pixel as neighboring point data, estimate one surface based on the neighboring point data, and perform association for calculating a position of the target pixel on the one surface in a space to which the plurality of point data items belong.

2. The measurement apparatus according to claim 1, wherein the at least one processor is further configured to execute the instructions to:

in selecting the neighboring point data, calculate perpendicular distances between a viewing direction, which is a direction in which an image-capturing apparatus that has acquired the image data faces, the viewing direction passing through the target pixel, and the plurality of respective point data items, and select the neighboring point data in an order of increasing perpendicular distance.

3. The measurement apparatus according to claim 2, wherein the viewing direction passes through a center point of the target pixel.

4. The measurement apparatus according to claim 2, wherein point data that is, when seen in the viewing direction, positioned inside a circle that has a predetermined radius and is centered around the viewing direction is selected as the neighboring point data.

5. The measurement apparatus according to claim 1, wherein the at least one processor is further configured to execute the instructions to:

in selecting the target pixel, select a plurality of the target pixels, and in selecting the neighboring point data, perform the association regarding each of the plurality of target pixels that have been selected.

6. The measurement apparatus according to claim 5, wherein the plurality of target pixels include a first target pixel and a second target pixel, and the at least one processor is further configured to execute the instructions to, in selecting the target pixel, select a pixel that is positioned at one end of a phenomenon to be measured in the object in the image data as a first target pixel and select a pixel that is positioned at another end of the phenomenon as a second target pixel.

7. The measurement apparatus according to claim 6 wherein the at least one processor is further configured to execute the instructions to detect a phenomenon to be measured in the object in the image data, and in selecting the target pixel select the first and second target pixels based on the phenomenon that has been detected.

8. The measurement apparatus according to claim 5, wherein the plurality of target pixels include a first target pixel and a second target pixel, and the at least one processor is further configured to execute the instructions to, in selecting the target pixel, select a pixel that is positioned at one corner of a rectangular area formed of a plurality of pixels, the rectangular area including a phenomenon to be measured in the object in the image data, as a first target pixel, and select a pixel that is positioned at a position diagonal to the first target pixel as a second target pixel.

9. The measurement apparatus according to claim 8, further comprising a display unit configured to display the rectangular area on the image data or the 3D data.

10. The measurement apparatus according to claim 9, wherein the display unit displays the first and second target pixels on the image data or the 3D data.

11. The measurement apparatus according to claim 9, wherein the display unit displays, on the image data or the 3D data, a scale in accordance with a scale size of the image data or the 3D data that has been displayed.

12. The measurement apparatus according to claim 9, wherein the display unit displays the calculation result on the image data or the 3D data.

13. The measurement apparatus according to claim 5, wherein the plurality of target pixels include a first target pixel and a second target pixel, and the at least one processor is further configured to execute the instructions to, in selecting the target pixel, select, of pixels that overlap a phenomenon to be measured in the object in the image data, a pixel at one end of each row as the first target pixel and select a pixel at the other end of each row as the second target pixel, or select a pixel at one end of each column as the first target pixel and select a pixel at the other end of each column as the second target pixel.

14. The measurement apparatus according to claim 13, further comprising a display unit configured to display a pixel that overlaps the phenomenon on the image data or the 3D data.

15. The measurement apparatus according to claim 13, further comprising a display unit configured to display point data that corresponds to the pixel that overlaps the phenomenon on the image data or the 3D data.

16. The measurement apparatus according to claim 1, wherein the one surface is a plane or a curved surface calculated based on the neighboring point data.

17. The measurement apparatus according to claim 1, wherein the 3D data is formed as a LiDAR device that acquires the 3D data by scanning the object to be measured by laser light.

18. A measurement system comprising:

an image-capturing apparatus configured to output image data acquired by capturing an image of an object;

a 3D data acquisition apparatus configured to acquire 3D data of the object; and a measurement apparatus configured to associate the image data with the 3D data of the object, wherein the measurement apparatus comprises:

at least one memory configured to store instructions, and at least one processor configured to execute the instructions to:

receive the image data and the 3D data, perform alignment between the image data and the 3D data, and output data after the alignment;

select a target pixel from a plurality of pixels included in the image data; and select, from a plurality of point data items of the 3D data included in the data after the alignment, three or more point data items near the target pixel as neighboring point data, estimate one surface based on the neighboring point data, and perform association for calculating a position of the target pixel on the one surface in a space to which the plurality of point data items belong.

19. A measurement method comprising:

receiving image data acquired by capturing an image of an object and 3D data of the object, performing alignment between the image data and the 3D data, and outputting data after the alignment;

selecting a target pixel from a plurality of pixels included in the image data; and selecting, from a plurality of point data items of the 3D data included in the data after the alignment, three or more point data items near the target pixel as neighboring point data, estimating one surface based on the neighboring point data, and performing association for calculating a position of the target pixel on the one surface in a space to which the plurality of point data items belong.

\* \* \* \* \*